(12) United States Patent
Guerra

(10) Patent No.: US 12,051,793 B2
(45) Date of Patent: Jul. 30, 2024

(54) PHOTOELECTROCHEMICAL SECONDARY CELL AND BATTERY

(71) Applicant: John M. Guerra, Concord, MA (US)

(72) Inventor: John M. Guerra, Concord, MA (US)

(*) Notice: Subject to any disclaimer, the term of this patent is extended or adjusted under 35 U.S.C. 154(b) by 121 days.

(21) Appl. No.: 17/563,165

(22) Filed: Dec. 28, 2021

(65) Prior Publication Data

US 2022/0123391 A1 Apr. 21, 2022

Related U.S. Application Data

(62) Division of application No. 16/545,617, filed on Aug. 20, 2019, now abandoned, which is a division of application No. 16/036,176, filed on Jul. 16, 2018, now abandoned, which is a division of application No. 14/721,213, filed on May 26, 2015, now Pat. No. 10,050,319.

(60) Provisional application No. 62/004,159, filed on May 28, 2014.

(51) Int. Cl.
  *H01M 14/00* (2006.01)
(52) U.S. Cl.
  CPC ........... *H01M 14/005* (2013.01); *Y02E 10/52* (2013.01)
(58) Field of Classification Search
  None
  See application file for complete search history.

(56) References Cited

U.S. PATENT DOCUMENTS

| | | |
|---|---|---|
| 3,874,928 A | 4/1975 | Will |
| 4,107,395 A | 8/1978 | van Ommering et al. |
| 4,107,405 A | 8/1978 | Percheron born Guegen et al. |
| 4,112,199 A | 9/1978 | Dunlop et al. |
| 4,125,688 A | 11/1978 | Bonnaterre |
| 4,214,043 A | 7/1980 | van Deutekom |
| 4,216,274 A | 8/1980 | Bruning et al. |
| 4,487,817 A | 12/1984 | Willems et al. |
| 4,551,400 A | 11/1985 | Sapru et al. |
| 4,605,603 A | 8/1986 | Kanda et al. |
| 4,696,873 A | 9/1987 | Yakasaki et al. |
| 4,699,876 A | 11/1987 | Heuts et al. |
| 4,728,586 A | 3/1988 | Venkatesan et al. |
| 5,096,667 A | 3/1992 | Fetcenko |
| 5,348,822 A | 9/1994 | Ovshinky et al. |
| 5,536,591 A | 7/1996 | Fetcenko et al. |
| 5,637,423 A | 6/1997 | Ovshinky et al. |
| 5,803,933 A | 9/1998 | Kilb |
| 6,017,655 A | 1/2000 | Ovshinky et al. |
| 7,485,799 B2 | 2/2009 | Guerra |
| 8,673,399 B2 | 3/2014 | Guerra et al. |
| 2004/0072683 A1 | 4/2004 | Kodas |
| 2006/0137740 A1 | 6/2006 | Park |
| 2009/0134842 A1 | 5/2009 | Joshi |
| 2010/0209764 A1 | 8/2010 | Heo |
| 2013/0029198 A1 | 1/2013 | Susuki |
| 2014/0194282 A1 | 7/2014 | Young |
| 2014/0335380 A1* | 11/2014 | Riggs .................... H01M 16/00 429/9 |

(Continued)

*Primary Examiner* — Eli S Mekhlin
(74) *Attorney, Agent, or Firm* — David J. Cole

(57) ABSTRACT

A photoelectrochemical secondary cell comprising a photocatalytic anode, or photoanode; an anode; a cathode comprising a metal hydride; electrolyte; separator; and case at least a portion of which is transparent to the electromagnetic radiation required by said photoanode to charge said photoelectrochemical secondary cell.

16 Claims, 2 Drawing Sheets

(56) References Cited

U.S. PATENT DOCUMENTS

2015/0219583 A1* 8/2015 Dumschat ............ G01N 27/404
  204/431

* cited by examiner

PHOTOELECTROCHEMICAL SECONDARY CELL AND BATTERY

REFERENCE TO RELATED APPLICATION

This application is a divisional of copending application Ser. No. 16/545,617, filed Aug. 20, 2019, which is a divisional of application Ser. No. 16/036,176, filed Jul. 16, 2018 (Publication No. 2019/0140,331), which itself is a divisional of application Ser. No. 14/721,213, filed May 26, 2015 (Publication No. 2016/0365615975, now U.S. Pat. No. 10,050,319, issued Aug. 14, 2018), the entire disclosure of which is herein incorporated by reference. application Ser. No. 14/721,213 claims benefit of provisional Application Ser. No. 62/004159, filed May 28, 2014.

FIELD OF THE INVENTION

The present invention relates to a photoelectrochemical secondary cell and battery thereof comprising: positive electrodes comprising at least a photocatalytic anode, or photoanode, and an anode such as of nickel hydroxide material; a negative electrode (cathode) comprising substantially a metal hydride; electrolyte; separator; and case at least a portion of which is transparent to electromagnetic radiation required by said photoanode to charge said photoelectrochemical secondary cell.

BACKGROUND OF THE INVENTION

Personal digital devices, distributed electricity for the developing as well as developed world, electric vehicles, telecom equipment, space vehicles, and military field apparatus, to name only a few applications, all require and will benefit from a high energy density battery that is directly and efficiently self-recharging in sunlight or even ambient artificial light.

Batteries coupled with chargers that employ photovoltaic (PV) cells, panels or arrays are ubiquitous, but they do not improve the charging efficiency because they do nothing to change the oxygen evolution potential of the anode that utilizes some of the power that could have gone into charging. And silicon-based PV technology is not compatible with the environment in alkaline batteries and so they cannot be truly integral.

Fuel cells are making inroads in remote power and backup power applications, but face an uphill climb to replace batteries because they further require a hydrogen source that, if renewable, comprises at least photovoltaic (PV) panels, electrolyzer, purifier, compressor, and storage cylinder. All these discrete components must be managed, and together comprise an expensive, bulky and inelegant system with reliability issues arising from the integration of so many components. Moreover, the stack-up efficiency losses of these components (50% electrolyzer energy loss, 50% fuel cell energy loss, and 10% compression energy loss, and 15% solar to electricity PV conversion) results in less than 4% of the incoming sunlight being converted to electricity for use when there is no sunlight (as compared to 15% direct solar-to-electricity PV conversion efficiency).

Fuel cell systems further require water replenishment. While theoretically the water from the fuel cell exhaust can be condensed, captured and used for replenishment, in practice this is not very effective or efficient and requires additional hardware and management thereof. One can imagine the difficulty in replenishing water in a fuel cell system at the top of a telephone pole or telecomm tower, and in winter for example.

Some fuel cell manufacturers have developed fuel cells that can be operated in reverse as electrolyzers to produce their own hydrogen supply, and in some cases reasonable hydrogen compression can be achieved on board electrochemically as well, thereby removing the discrete electrolyzer and compressor components from the system. However, such reversible fuel cells still suffer from "round trip" efficiency of less than 25%, so when powered by 15% efficient PV, solar-to-electricity-to-hydrogen and back to electricity is again less than 4% efficient. This is because it is difficult to optimize the same device for operation as both fuel cell and electrolyzer. Other issues include high cost, difficulty to reduce package size, lifetime, and inadequate on-board hydrogen storage density as compressed gas compared to a discrete compressor and storage cylinder.

The compressor and cylinder in the first system example above can in principle also be replaced by use of discrete dry metal hydride (MH) for hydrogen storage, but still some amount of compression and/or heating are required for the metal hydride to absorb hydrogen. And because heating of the MH is required to release the hydrogen there is a parasitic loss (which may not be a problem when there is an adequate source of waste heat available, but this is unlikely in remote applications).

As is well known in the art, metal hydrides can be employed for storing electricity through electrochemical storage of hydrogen in Ni-MH cells and batteries comprised of such cells. When charging, such cells are essentially alkaline electrolyzers, except that the hydrogen produced is a means to electrical storage and generation, rather than an end product as with electrolyzers. When an electrical potential is applied, hydrogen is both produced and absorbed by the metal hydride (MEI) cathode along with some amount of oxygen evolution at the anode. The latter is, for battery purposes, a parasitic energy loss. Absorption, as well as release during discharge, of hydrogen by the metal hydride is governed by the electrical voltage (potential), and polarity applied to the cell electrodes. This is a much simpler, reliable, and more efficient way to charge the MH with hydrogen than is the case for dry external metal hydrides. In general, Ni-MH cells utilize the aforementioned negative MH electrode for reversible electrochemical storage of hydrogen, and a positive electrode of nickel hydroxide (Ni(OH)$_2$) material. Nickel hydroxide has been used for years as an active material for the positive electrode of alkaline batteries, including the nickel cadmium (Ni—Cd) batteries that have been largely supplanted by Ni-MH technology.

The negative and positive electrodes are spaced apart in the alkaline electrolyte. Upon application of an electrical potential across a Ni-MH cell, the MEI material of the negative electrode is charged by the electrochemical absorption of hydrogen and the electrochemical generation of hydroxy ions OH$^-$:

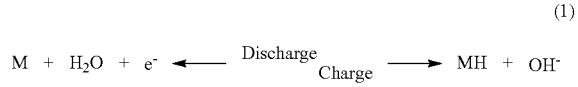

(1)

The negative electrode (cathode) reactions are reversible. Upon discharge, the stored hydrogen is released to form a water molecule and evolve an electron.

The reactions that take place at the nickel hydroxide positive electrode (anode) of a Ni-MH cell are:

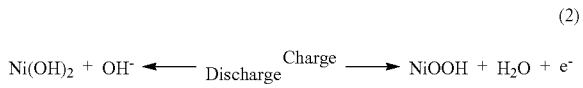
(2)

Hence, the charging process for a nickel hydroxide positive electrode in an alkaline storage battery is governed by the following equation:

$$Ni(OH)_2 + OH^- \rightarrow NiOOH + H_2O + e^- \quad (3)$$

The charging efficiency of the positive electrode and the utilization of the positive electrode material is effected by the energy-parasitic oxygen evolution process which is controlled by the reaction:

$$2\ OH^- \rightarrow H_2O + \tfrac{1}{2}O_2 + 2\ e^- \quad (4)$$

During the charging process, a portion of the current applied to the battery for the purpose of charging, is instead consumed by the oxygen evolution reaction (4). The oxygen evolution of equation (4) is not desirable and contributes to lower utilization rates of the positive active material upon charging. (An analogy can be made to discrete dry MH that absorbs more gaseous hydrogen as the pressure of the hydrogen is increased, where in Ni-MH cells the "pressure" is the electrical current, or rate of hydrogen production, during charging that is proportional to the degree of utilization of the MH storage).

One reason both reactions (oxygen and hydrogen evolution) occur simultaneously is that their electrochemical potential values are very close. Anything that can be done to widen the gap between them, lowering the nickel (or anode) electrochemical potential in reaction (3) or raising the electrochemical potential of the oxygen evolution reaction (4), will contribute to higher utilization rates (higher hydrogen production rate and therefore higher absorption by the MH electrode). U.S. Pat. No. 6,017,655 is one attempt to widen this gap by use of disclosed additives to the nickel hydroxide anode. It is noted that the electrochemical potential of the oxygen evolution reaction (4) is also referred to as the oxygen evolution potential.

Another way that is disclosed herein is to separate the functions of the anode, reserving use of the nickel hydroxide (or other) anode for discharge and for supplemental charging only, while adding a photocatalytic anode, or photoanode, for charging that, when activated by light, reduces or eliminates the required electrochemical potential. Photoanodes are semiconductors, modified semiconductors, or semiconductor compounds in monolithic form, or paste on monolithic form, that absorb and then convert photons of light into pairs of surface charges that can either electrolyze water directly or reduce the voltage normally required for electrolysis. Ideally such semiconductor photoanodes have conduction and valance band edges that overlap either the hydrogen evolution potential, the oxygen evolution potential, or both. If both, then spontaneous water electrolysis occurs when the photoanode is illuminated; this is known as photolysis. Otherwise a bias voltage or overpotential voltage that is considerably less than even the theoretical 1.48 VDC electrolysis potential, is required to initiate electrolysis by bridging the gap between either band edge and its respective evolution potential, in which case the process is called photoelectrochemical hydrogen production. (For the purpose of describing the invention herein, whether the photoanode requires no bias or some non-zero bias voltage the resulting secondary cell is called "photoelectrochemical".) For example, U.S. Pat. No. 7,485,799 to Guerra, and U.S. Pat. No. 8,673,399 to Guerra et al disclose photoanodes in which nanostructures strain a semiconductor such as titanium dioxide (titania or $TiO_2$) such that the bandgap of the semiconductor is altered to favorably absorb more of the solar spectrum and also the band edges are more favorably aligned with the hydrogen and/or oxygen evolution potentials.

So semiconductor photoanodes, when illuminated with light having energy hv where h is Plank's Constant and v is the frequency of that light, greatly reduce or even eliminate the applied electrical potential (or voltage) required because a band edge is either close to or overlaps the oxygen and/or hydrogen evolution potential(s). Absorption of the light energy forms charge pairs of electrons ($e^-$) and holes ($p^+$) at the semiconductor surface (SC) as in (5) below.

$$hb + SC \rightarrow (e^- + p^+) \quad (5)$$

Except that the electrons and positive charges arise from interaction of light with the semiconductor photoanode rather than from an external applied electrical potential, the governing reaction for oxygen evolution (6) can be seen to be identical with (4) above for a conventional anode:

$$2p^+ + 2\ OH^- \rightarrow H_2O + \tfrac{1}{2}O_2 \quad (6)$$

Because a Ni-MH battery is, in the charge mode, basically an alkaline electrolyzer, it will be seen that it can be improved by addition of a photoanode. Presently, external electricity applied to the nickel hydroxide anode and MH cathode produces, from the aqueous electrolyte, hydrogen at the cathode and oxygen at the anode. The hydrogen is immediately absorbed by the metal hydride for use to produce electricity during later discharge. (This is one of the sources of efficiency in the MH architecture in that less energy is required for the hydrogen to be absorbed by the MH than to be evolved from a "normal" cathode.) The high power density of Ni-MH batteries comes from the fact that hydrogen can be stored in metal hydrides at energy densities even greater than that of liquified hydrogen. The theoretical voltage required to split the water in the electrolyte is 1.23 VDC. However, the overvoltage that is required to overcome the oxygen potential brings the actual theoretical voltage to 1.48 VDC. An electrolyzer that can produce hydrogen with 1.48 VDC would then have an electrolyzer, or Faraday, efficiency of 100%. In practice, most electrolyzers are only 50% efficient, requiring nearly 3 VDC, to 75% efficient, requiring 2 VDC. Similarly, the electrolysis efficiency during the charging cycle in a typical Ni-MH battery is about 66%. Addition of a photocatalytic anode, or photoanode, reduces or even eliminates the amount of electrical power required to electrolyze water to produce hydrogen. Light works with the photocatalyst to either electrolyze the water directly, with no external electrical power required, in so-called "zero bias" or photolytic mode, or with significantly reduced electrical power in photoelectrochemical mode. For example, the photoanode taught in U.S. Pat. No. 8,673,399 is able to produce hydrogen from water even without external electricity, and has maximum hydrogen production at only 0.9 VDC, or half to even a third of the voltage that a conventional electrolyzer requires to produce an equivalent amount of hydrogen.

Therefore the present invention discloses a photoelectrochemical secondary cell that can employ these photoanodes as well as any other photoanodes for the charging cycle in a metal hydride battery.

Furthermore, charging of the photoelectrochemical secondary cell, or a battery comprised of multiple such cells, requires only sunlight for trickle charging. This is valuable in applications where an external electrical source that may not be readily available, such as to power telecom devices that are often in remote locations or atop towers and poles, but also for personal electronic devices or batteries for space. And while faster charging will still require an external electrical supply, that supply power requirement is greatly reduced by the properties of the photoanode.

SUMMARY OF THE INVENTION

An objective of the present invention is an integrated efficient rechargeable battery for use in remote locations, telecom, distributed power, personal digital devices, space platforms, and electric vehicles that is self-rechargeable in sunlight or artificial light and that further employs light to increase the efficiency of charging with external electricity.

This and other objectives are satisfied by a photoelectrochemical secondary cell, comprising both a photocatalytic anode, or photoanode, and an anode such as of nickel hydroxide material; a negative electrode, or cathode, comprising a metal hydride; and electrolyte.

This and other objectives are satisfied by a photoelectrochemical secondary cell that further comprises separator materials between said cathode and anodes; and case that has at least a portion that is transparent to at least the electromagnetic radiation required by said photoanode to charge said photoelectrochemical secondary cell.

This and other objectives are satisfied by said photoelectrochemical secondary cell wherein said photoanode and anode are electrically separate.

This and other objectives are satisfied by a multitude of said photoelectrochemical secondary cells adjacent to one another and coplanar and connected electrically in series or in parallel to form a substantially light-rechargeable MH battery.

This and other objectives are satisfied by a multitude of said photoelectrochemical secondary cells stacked vertically with space and means between each of said cells to facilitate guiding of external light to said photoanodes and connected to form a substantially light-rechargeable MH battery having a common case, a portion of said case having a window that is transparent to at least the electromagnetic radiation required by said photoanodes to charge said rechargeable battery.

BRIEF DESCRIPTION OF THE DRAWINGS

The structure and operation of the invention, together with the objects and advantages thereof, may best be understood by reading the detailed description to follow in connection with the drawings in which unique reference numerals have been used throughout for each part and wherein.

DETAILED DESCRIPTION OF THE INVENTION

Disclosed herein is a photoelectrochemical secondary cell used singly or in multiples to form a metal hydride (MH) rechargeable battery that is (1) more efficiently charged and (2) is charged with light alone or (3) light together with electricity or (4) electricity alone. Said photoelectrochemical secondary cell comprises a photocatalytic anode, or photoanode, an anode, a metal hydride cathode, separator means for keeping gas products separate while passing ions, and case that comprises at least in part a window that is able to transmit at least the part of the electromagnetic spectrum required by said photoanode to produce hydrogen and therefore to charge the cell.

Figure 1:
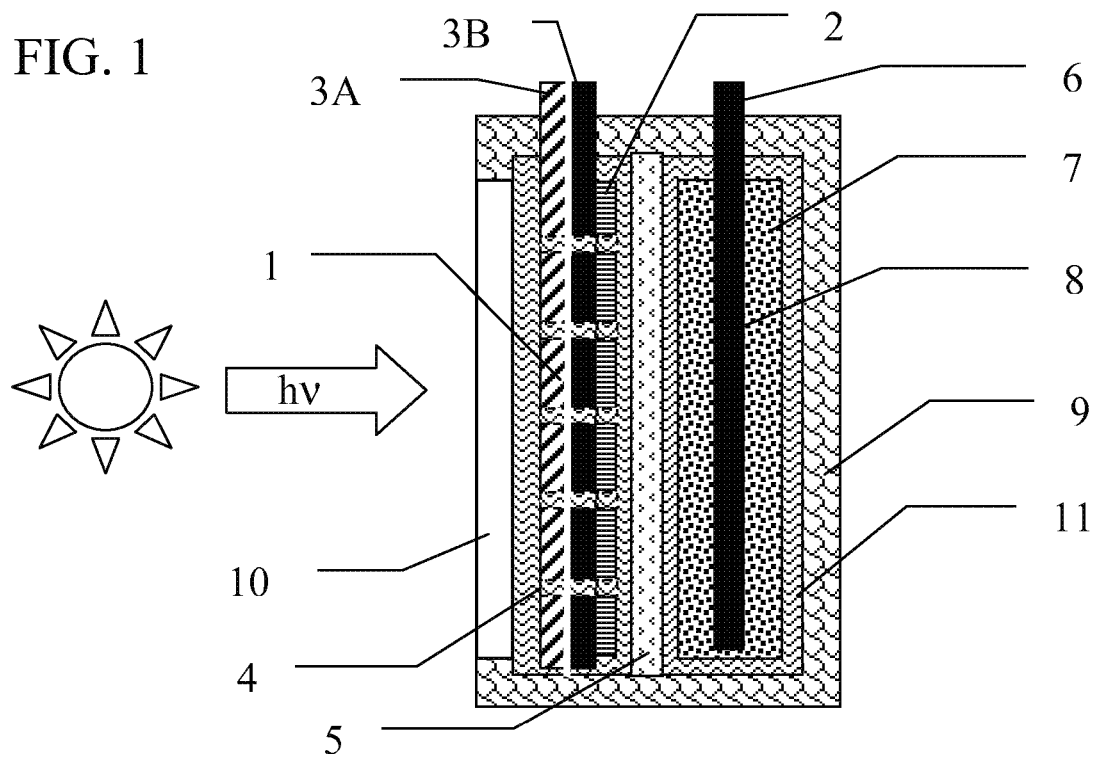
FIG. 1 is a schematic cross-section of the photoelectrochemical secondary cell wherein photoanode and anode are conjoined physically but may or may not be electrically isolated, with the electrical isolation case shown.

Referring to FIG. 1, in a first embodiment, the photoanode 1 and anode 2 share the same proximal position but each have their own conductive electrode bases 3A and 3B, respectively, which may comprise titanium, nickel, carbon, graphite, or other conductive material suitable for the alkaline environment. Alternately, photoanode and anode may be conjoined physically and electrically on a common conductive base. This is desirable for applications where the battery is always trickle charging in light and discharging only in dark, as in a solar-powered drone aircraft for example; having the discharge anode conjoined with the photoanode is advantageous, saving weight and cost. Electrical shorting is averted by an external charging management circuit 12, shown in FIG. 2 but applicable to all other figures including FIG. 1 as well, which at least connects photoanode to cathode for charge, and disconnects upon full charge and for discharge. Anode 2 material can be nickel hydroxide on nickel, mixed metal oxides on titanium (MMO), plated nickel or nickel hydroxide film on titanium, nickel or nickel hydroxide particles on titanium, or other suitable anode. Louvers or other apertures 4 are formed into the photoanode 1 and anode 2 combination in order to provide an ion path between the illuminated surface of the photoanode and the cathode 6. Louvers are advantageous over simple holes, for example, because no light-receiving photoanode surface is lost. Gas separation means 5 can be non-woven felts of polyolefin, polyethylene, polypropylene, or other. Typically their thickness is about 2 to 4 mm. Additionally, the gas separation means can have surfaces that are thermally, chemically, or otherwise treated to prevent or reduce gas bubbles from sticking to its surfaces. Gas separation means are sealed to the case 9. Where the case 9 is acrylic, one means of said sealing can be accomplished with solvent welding using thick acrylic solvent cement, for example. (The natural white scattering color of most gas separation means can be used to advantage in the embodiment in FIG. 4, for example, where light is scattered back to the photoanodes.) The cathode 6 comprises metal hydride 7 in electrical contact with a nickel foam ribbon 8, for example. Case 9 includes a light-transmissive window 10 as well as overpressure port (not shown for clarity) as is standard in MIR battery art. Window 10 can be of ultraviolet-transmitting (UVT) acrylic, borosilicate 3.3 glass, or other material. Further, it can be coated with anti-static, anti-reflection, heat-rejection, or other optical coatings and structures including but not limited to diffraction gratings and holographic concentrating or light-directing optics. For simplicity in illustration, the case shown is of a non-conductive material and so electrode-to-case isolation is not required or shown. However it will be understood that the case can be comprised of any of the materials and lined materials now commonly used in the alkaline battery art. All above components are immersed in electrolyte 11 that can be KOH, preferably 26% by weight, or potassium carbonate preferably with pH of about 11.7 to 12. Additionally the electrolyte can include additives such as methanol (only for the KOH as it is immiscible with potassium carbonate), thickeners, co-electrolytes, or other such as to increase refractive index and/or to match the refractive index to that of window 10. Both case and window are shown to be substantially planar in the figures, but it will be understood that they can also have convex or concave cylindrical surfaces. The latter is useful in that it provides extra strength should excess pressure build up in the case, either upon failure of a vent, or to allow intentional higher-pressure operating conditions, while the former can provide an optically more efficient focal plane for an external light concentrator optic.

Figure 2:
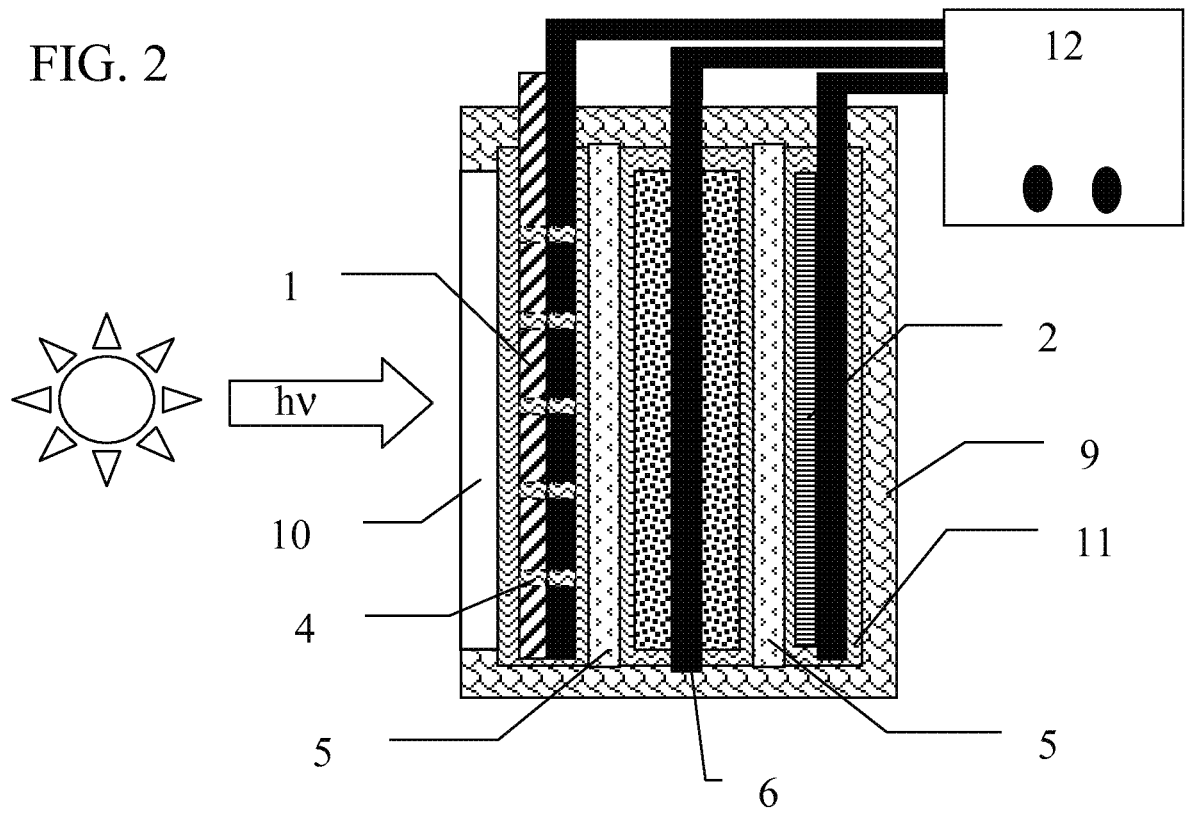
FIG. 2 is a schematic cross-section of the photoelectrochemical secondary cell wherein photoanode and anode are physically and electrically separate and further showing block diagram of means for external charging management.

Referring to FIG. 2, in a second embodiment, the nickel hydroxide (or other) anode 2 is separate from the photoanode 1 and is on the opposite side of the metal hydride cathode 6, with gas separators 5 placed between photoanode and cathode and cathode and anode and again are sealed to case 9. This embodiment is preferred when the batteries will routinely be charged both with the photoanode as well as the anode simultaneously, as the latter will depress the photoanode charging to some degree if both are proximal and on the same side of the cathode. It is important to note that in this case the cathode 6, although shared by the photoanode and the anode electrically, is sealed to the case (unlike FIG. 1), providing a physical and electrochemical separation between the electrolyte in the photoanode volume and the electrolyte in the anode volume of the cell. This completes the separation and eliminates "cross-talk" between photoanode and anode that, again, during full charging would reduce the photoanode charging contribution. Additionally shown in FIG. 2 is a block diagram of a charging management means 12 that can either be external to the battery, as part of the device into which the battery is inserted, or internal to the battery (meaning attached to and integrated with but outside the case 9). Charging management means 12 receives the photoanode, cathode, and anode as inputs, and has discharge positive and negative outputs which can also function as charging inputs.

Figure 3:
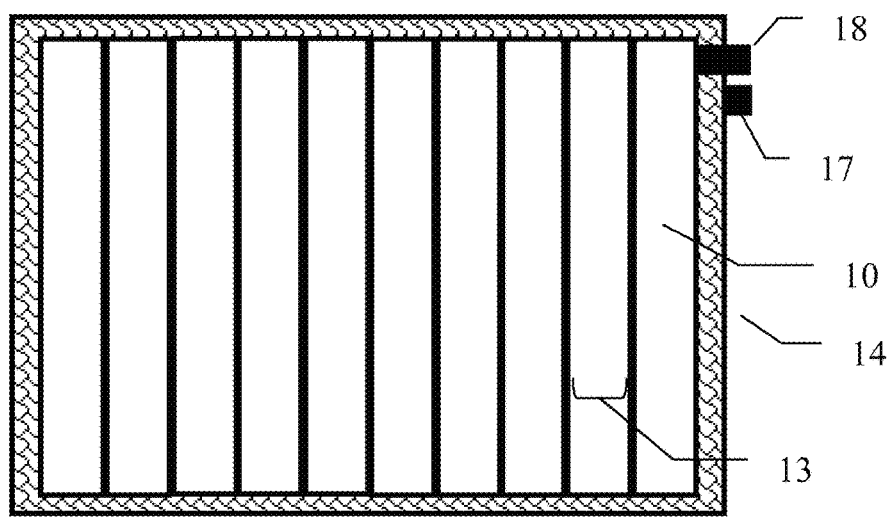
FIG. 3 is a schematic frontal view of a substantially light-rechargeable MH battery comprising photoelectrochemical secondary cells such as in FIG. 1 or 2 above positioned adjacent to each other in planar arrangement.

Referring to FIG. 3, multiple photoelectrochemical secondary cells 13 are mounted adjacent to form a planar battery 14 that can be positioned to face the light source. Adjacent cells 13 can be connected electrically in series or in parallel for either higher voltage or higher current respectively. Further, common connector 18 is for the photoanodes/anodes while common connector 17 is for the cathodes. In this embodiment the louvers 4 are again required in photoanodes 1 to provide an ion pathway to the cathodes. Although not visible in this frontal view, the photoanode, cathode, and anode architecture can be that of either photoelectrochemical secondary cell illustrated in FIG. 1 or 2 and described above. Each cell 13 has a window 10 as previously described.

Figure 4:
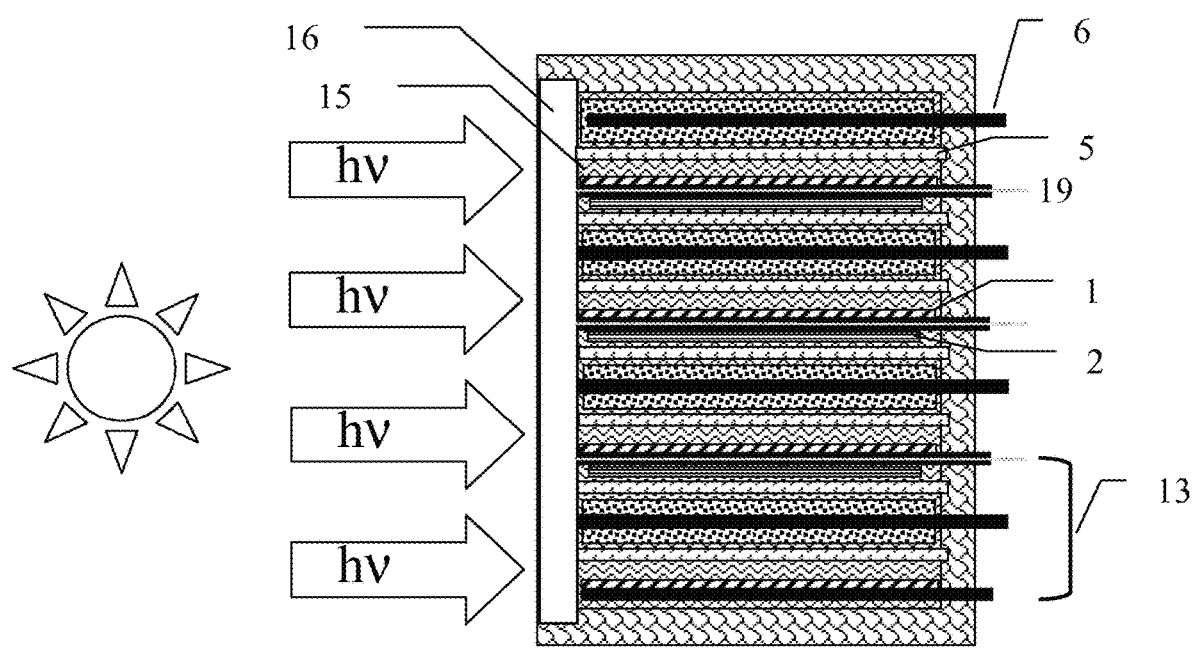
FIG. 4 is a schematic cross-section view of a substantially light-rechargeable MH battery comprising photoelectrochemical secondary cells stacked atop one another and further comprising light guiding means.

Referring to FIG. 4, multiple photoelectrochemical secondary cells 13 are stacked vertically with spacing that allows sunlight to fully illuminate each cell with or without light guide means 15. All electrode surfaces are substantially perpendicular to the receiving window 16, rather than parallel to the window 10 of previous embodiments described above. Light guide means 15 can include light scattering, waveguiding or light-piping, diffraction, refraction, or reflection to each photoanode 1 by a portion of the gas separator material 5 above said photoanode or by a specialized separate optical surface or surfaces. The receiving window 16, as with the receiving windows 10 in FIGS. 1, 2 and 3, may be placed at the focus of a light concentrator, or can just operate in ambient light. In this embodiment each photoanode 1 is directly facing metal hydride cathodes 6 with direct ion pathway (physically only the gas separators 5 are between them, but they have low ionic resistance) so there is no need for the louvers 4 in the other embodiments. Further, eliminating the louvers eliminates the cross-talk between the photoanode and anode that served to depress the photoanode charging contribution during simultaneous anode charging as described in FIG. 2 above, so that they can be conjoined. Receiving window 16, as with windows 10, can be an ultraviolet-transmissive (cast is preferred but extruded is acceptable) UVT acrylic that is produced by Evonic Degussa, Cyro, and others, or it can be borosilicate 3.3 glass from Schott and others. Though not shown in the figures, the window can further be coated with an anti-reflection coating, scratch-resistant coating, anti-static coating, or other optical coating such as a diffractive or holographic optical grating or other holographic optical structure. The remainder of the case can be solvent-welded, ultrasonically-welded, cast, or injection-compression molded acrylic or other plastic, or it can be steel or other metal suitable for the alkaline environment, with or without linings. As with the embodiment in FIG. 2, the cathodes 6 in the embodiment in FIG. 4 are sealed to the window 16 as well as to the case so that they are shared electronically by the nearest adjacent photoanode 1 and anode 2, but they provide a physical and electrochemical isolation between the electrolyte in the photoanode volume and the electrolyte in the anode volume, again to eliminate cross-talk during charging. Additionally, the battery embodiment shown in FIG. 4 comprises the electrode architecture of both cell embodiments shown in FIGS. 1 and 2. Namely, in each cell 13 the photoanode 1 and anode 2 are placed on opposite sides of cathodes 6 as in FIG. 2, but each photoanode 1 also is proximal to the anode of the next cell, as in FIG. 1, with a separator placed between their respective bases both for electrical isolation as well as cell body isolation from the next cell.

It will further be understood that the photoelectrochemical secondary cell and substantially light-rechargeable MH batteries comprised thereof claimed in this invention and described herein, can have the same physical form as the vast variety of batteries in the art, and are not limited to the shapes shown schematically in the figures. So for example, they can be cylindrical as well as rectangular, they can have aspect ratios nearing unity or they can be flat.

Returning briefly to charging management, to allow the user to choose between zero-bias trickle charging anytime the battery is illuminated and higher-rate light-assisted charging, a connecting busbar can be placed between the external terminal of the photoanode 1 and of the MH cathode 6. In this mode, anytime the battery is illuminated, it will be charged at a low rate, or trickle-charged. (Note that this only works for the case where the photoanode and anode are electrically isolated.) Removing this busbar and connecting an external power supply between the photoanode 1 and MH cathode 6 terminals allows charging at higher rates, with maximum charge rate occurring at about 1 VDC. If the photoanode and anode share the same conductive base, then a diode can be used in place of the busbar, which has the advantage that it can always remain in place without shorting, but at the cost of some amount of voltage drop that even the most efficient diodes exhibit. Finally, even higher-rate charging can be achieved in the normal fashion, with a charging power supply connected between the anode 1 and the cathode 6. When the battery is integral with a device, then the management of charging modality just described can be more conveniently and effectively accomplished with an integrated circuit (shown in block diagram form as 12 in FIG. 2) designed for this task external to the photoelectrochemical secondary cell battery but integral with said device. Said management of charging modality may also be software-controllable. And said integrated circuit may also be integral to said photoelectrochemical secondary cell battery.

Photoanode 1 may be any photocatalytic anode or photoanode material known in the art. It is within the spirit and intent of this invention that any and all kinds of photoanode materials may be used. Examples of possible photoanode materials are provided in U.S. Pat. Nos. 7,485,799 and 8,673,399, the contents of which are incorporated by reference herein, disclose photoanodes in which nanostructures strain a semiconductor such as titanium dioxide (titania or $TiO_2$) such that the bandgap of the semiconductor is altered to favorably absorb more of the solar spectrum and also the band edges are more favorably aligned with the hydrogen and/or oxygen evolution potentials.

Additional photoanode 1 materials, whether in the art or not, are also within the scope and spirit of this invention. They include but are not limited to (1) titania that is dyed to absorb light beyond that which is normally absorbed by titania, (2) titania that is doped with nitrogen, carbon, silicon, or other element, (3) strontium titanate, (4) compounds and alloys of titania and titanium with tungsten or tungsten oxide, cadmium sulfide, iron or oxides of iron, silicon, or other, (5) silicon seeded with protective nickel surface particles, (6) nanotubes of titanium dioxide further comprising dopants, dyes, or compounds as listed above, (7) carbon nanotubes further comprising semiconductor materials, (8) and graphene alone or combined with photoanode materials listed above, (9) photoanodes that incorporate either quantum dots or photonic bandgap crystals for enhanced light absorption, and (10) any or all of the preceding photoanode materials in combination with the strained titania photoanode taught in U.S. Pat. Nos. 7,485, 799 and 8,673,399.

The nickel hydroxide material for the anode 2, that is to say other than the photoanode 1, may be any nickel hydroxide material known in the art. It is within the spirit and intent of this invention that any and all kinds of nickel hydroxide materials may be used. Examples of possible nickel hydroxide materials are provided in U.S. Pat. Nos. 5,348,822 and 5,637,423 and 6,017,655 the contents of which are incorporated by reference herein.

The anode 2 may also comprise materials and anodes not now found in commercial Ni-MH batteries. For example, a titanium metal base (rod, plate, sheet, foil, expanded mesh, or other) coated with mixed metal oxides (MMO, typically a mixture of oxides of ruthenium, titanium, and iridium) or with nickel or nickel hydroxide film or particles may also serve as a suitable anode. These anodes can have other conductive bases such as but not limited to carbon and graphite, or other conductive material that can function as either anode (during charging) or cathode (during discharging) in an alkaline environment. Means of manufacturing said anodes includes but is not limited to steps that may comprise one or more of applying a paste, sintering, calcification, thermal oxidation, anodizing, alloying, plating, powder coating, mechanical compression, casting, vacuum deposition, chemical vapor deposition, or other. Anodes formed with these or other processes and with these or other materials are within the spirit and scope of this invention.

In general, a photoelectrochemical secondary cell comprises, just as an electrochemical cell does, at least one positive electrode, at least one negative electrode, and an electrolyte surrounding the positive and negative electrodes. In addition, the photoelectrochemical secondary cell further comprises at least one photoanode. The electrolyte 11 is an alkaline electrolyte which may comprise a potassium hydroxide solution (KOH) or a potassium carbonate solution ($K_2CO_3$), and may further comprise other electrolytes as well as additives and/or co-electrolytes for improved performance such as but not limited to low or high temperature performance, or more efficient gas release, or beneficial leak-containment properties such as viscosity or polymerization, or higher index of refraction.

The metal hydride negative electrode 6 comprises metal hydride material 7 affixed to an electrically conductive substrate 8, which is often a nickel foam ribbon but can also be carbon, graphite, or titanium. It is within the spirit and intent of this invention that any and all kinds of metal hydride materials and substrates may be used, including but not limited to those surveyed herein. Since the early work at Battelle in the 1960's shortly after invention of the Ni-MH battery, which employed negative electrodes based on sintered Ti2Ni+TiNi+x alloys, many improvements have been made and new materials found. Intermetallic compounds with preferred hydrogen storage properties for Ni-MH batteries are commercially available through sources such as Sigma-Aldrich. One is a metal alloy with elemental form $AB_2$ is $ZrV_2$ that forms the hydride $ZrV_2H_{5.5}$ with structure Fd3m. It exhibits high 3.01% hydrogen storage by weight (Wt % $H_2$) with an equilibrium pressure at temperature Kelvin ($P_{eq}$, T(K)) of only $10^{-8}$ bar @323° K. One of $AB_5$ form is $LaNi_5$, with hydride $LaNi_5H_6$. With P6/mm structure, it exhibits 1.37 Wt % $H_2$ at only 2 bar and 298° K. And one of form AB is FeTi, forming hydride $FeTiH_2$. With Pm3m structure, it exhibits 1.89 Wt % $H_2$ at only 5 bar and 303° K. Additional examples of metal hydride materials are the Ti—V—Zr—Ni type active materials such as disclosed in U.S. Pat. No. 4,551,400 ("the '400 patent") to Sapru, Hong, Fetcenko, and Venkatesan, the disclosure of which is incorporated by reference. These materials reversibly form hydrides in order to store hydrogen.

Further metal hydride materials are described in U.S. Pat. No. 4,728,586 ("the '586 patent") to Venkatesan, Reichman, and Fetcenko, the disclosure of which is incorporated by reference. The '586 patent describes a specific sub-class of Ti—V—Ni—Zr alloys comprising Ti, V, Zr, Ni, and a fifth component, Cr. The '586 patent, mentions the possibility of additives and modifiers beyond the Ti, V, Zr, Ni, and Cr components of the alloys, and generally discusses specific additives and modifiers, the amounts and interactions of these modifiers, and the particular benefits that could be expected from them. Other examples of metal hydride materials are provided in U.S. Pat. No. 5,536,591, the disclosure of which is incorporated by reference herein.

In contrast to the Ovonic alloys just described, the older alloys were generally considered "ordered" materials that had different chemistry, microstructure, and electrochemical characteristics. The performance of the early ordered materials was poor, but in the early 1980's, as the degree of modification increased (that is as the number and amount of elemental modifiers increased), their performance began to improve significantly. This is due as much to the disorder contributed by the modifiers as it is to their electrical and chemical properties. This evolution of alloys from a specific class of "ordered" materials to the current multicomponent, multiphase "disordered" alloys is shown in the following patents: (i) U.S. Pat. No. 3,874,928; (ii) U.S. Pat. No. 4,214,043; (iii) U.S. Pat. No. 4,107,395; (iv) U.S. Pat. No. 4,107,405; (v) U.S. Pat. No. 4,112,199; (vi) U.S. Pat. No. 4,125,688 (vii) U.S. Pat. No. 4,214,043; (viii) U.S. Pat. No. 4,216,274; (ix) U.S. Pat. No. 4,487,817; (x) U.S. Pat. No. 4,605,603; (xii) U.S. Pat. No. 4,696,873; and (xiii) U.S. Pat. No. 4,699,856. (These references are discussed extensively in U.S. Pat. No. 5,096,667 and this discussion is specifically incorporated by reference).

EXAMPLE

A photoelectrochemical secondary cell comprising (1) a photoanode as taught in U.S. Pat. No. 8,673,399 comprising strained titanium dioxide on grade 1 titanium base, (2) a commercially available anode comprised of mixed metal oxide (MMO) coating on titanium base, (3) a gas separator comprising non-woven polyethylene felt, (4) a cathode, and (5) a case comprising solvent-welded ultraviolet-transmissive acrylic sheet. The cell outer dimensions are 19 cm wide×11 cm high×1.5 cm depth. The acrylic is 4 mm thick. The case further comprised vents to vent out excess gas while containing the electrolyte, with vents also removable to allow electrolyte fill. Both potassium hydroxide (KOH @ 26%) as well as potassium carbonate (saturated $K_2CO_3$) were tested as electrolytes individually. Two grade 2 titanium contacts and one 360 stainless steel contact protrude through the case and allow the photoanode, anode, and cathode respectively to be accessed electrically through the sealed case in order to measure voltage, current, and to apply a bias voltage. The light source was natural sunlight of about 700 watts per square meter (Concord, Mass. at astronomical noon in May) as measured with a Thor Labs radiometer. However, results similar to those in this example were also obtained with a solar simulator from Oriel. The temperature of the electrolyte was monitored and kept equal when comparing the charging rate of the photoanode versus the MMO anode.

This example is simply one illustration of the advantages of this invention, and in no way is meant to limit the scope of this invention or to exclude the use of other photoanodes, anodes, cathodes, electrolytes, separators, or cases. For example, a non-woven polyolefin or non-woven polypropylene felt can also be used as gas separator(s), the photoanode can be any of the photoanodes discussed in this specification as well as any other photoanodes including but not limited to dyed titania, doped titania, tungsten, cadmium sulfide, any of the iron oxides, titania alloyed or compounded with cadmium sulfide or tungsten or any of the iron oxides, silicon with nickel coating, and photoanodes comprising in part graphene or carbon nanotubes, the conventional anode can be nickel hydroxide as in commercial Ni-MH batteries or nickel plated onto titanium as film or particles as described earlier in this specification, the cathode can comprise the standard cathode commercially available in Ni-MH batteries or any of the metal hydrides whether discussed in this specification or not, and the case can be a metal case and the transparent window can be borosilicate 3.3 glass. Similarly, the size can be larger or smaller or thinner or thicker.

The rate of charging of this cell, i.e. hydrogen production at cathode, is indicated by electrical current flow between the photoanode and cathode or the anode and cathode respectively. (A current of 1 ampere indicates hydrogen production at a rate of 6.9 SCCM or standard cubic centimeters per minute.) Current was measured with a Fluke ammeter connected between the photoanode and the cathode, and then the MMO anode and the cathode, respectively, with a direct current (DC) bias voltage supply also connected and varied between zero VDC and 3 VDC. First the charging current was obtained with the photoanode in sunlight or artificial light as a function of applied voltage bias to produce a current-voltage (IV) curve. Then the same IV curve data were taken for the MMO anode, with care taken that the electrolyte temperature and light intensity for both measurements was the same. Further, the area of the MMO anode was optimized to produce the highest charging current as a function of applied voltage.

As taught in U.S. Pat. No. 8,673,399, the strained titania photoanode produced hydrogen at even zero volts of bias in sunlight and so is able to charge with no electricity. Applying a bias voltage increases the charge rate by at least 3× with maximum charge rate (as indicated by the electrical current measured by Fluke ammeter) occurring at about 0.9 VDC. The MMO anode, on the other hand, required 2.0 VDC to produce the same charging rate (electrical current) as the photoanode produced at only 0.9 VDC. However, the MMO anode was also able to produce even higher charging rates by increasing the bias voltage to more than 2.0 VDC. While this is a good option to have in a battery, the charging efficiency continues to decrease as the required voltage is increased.

Earlier in the specification the electrolyzer, or Faraday, efficiency was given as (1.48 V)/(electrolyzer voltage) where 1.48 VDC is the theoretical electrical potential required to produce hydrogen from water. On an electrical energy basis only, the measured photoanode electrical potential of 0.9 VDC indicates an efficiency of 164% compared to 75% for the MMO anode at measured 2.0 VDC. The round trip efficiency for Ni-MH batteries is typically 60%, with charging efficiency of about 66% and discharge efficiency of 90%. Therefore, because the photoelectrochemical secondary cell in this example has a charging efficiency of 164% on an electrical energy basis, a roundtrip efficiency of 148% follows (with the extra energy supplied of course by light and its interaction with the photocatalytic anode; no violation of thermodynamic laws are claimed). Because Ni-MH batteries are often coupled with PV panels (15% solar to electricity conversion efficiency) in the field, revisiting the discussion in the specification concerning solar-to-stored-and-discharged electrical efficiency we obtain 15%× 148%=22%, compared to less than 4% obtained with PV, electrolyzer, compressor and fuel cell. Trickle charging mode (zero bias voltage) results in even higher efficiency. The trade-off clearly is charging rate, but even if higher charging rates are obtained by using the anodes (as MMO anodes above) in supplemental charging mode, round trip efficiency of close to 100% can be obtained for solar-to-stored-and-discharged electrical efficiency of 15%, which is to say lossless storage on an electrical energy basis (i.e., not including the light energy received by the photoanode).

The nickel plated titanium anode produced hydrogen at a slightly higher rate than the MMO anode at the same bias voltage. Similarly, the KOH electrolyte yielded slightly higher hydrogen production rates compared to the potassium carbonate, but in some cases the latter is less-caustic and so the slightly lower charging rate is tolerable.

This example demonstrates that the photoelectrochemical secondary cell can, with at least one photoanode technology, recharge in light even without external electrical charge, and further that even at maximum charge rate obtained with external electrical charge, the electrical power required is less than half that of the MMO anode. In practice, the cell will "trickle" charge whenever there is light available to it, so that the battery comprised of the cells will always be ready for discharge. When deeper or faster charge is required, concentrators can be used for additional light for photoanode charging alone, or external electricity of up to 0.9 VDC can be applied to the photoanode. And still faster and deeper charging can occur with an external electrical supply of 2 VDC or more applied during the day in combination with the photoanode, or separately at night as is now done to store night-time wind energy or excess grid electricity.

Many photoanodes are able to operate at light concentrations of 10 suns and more. Some photoanodes' hydrogen production, and therefore charging, is linear with concentration up to 10 suns, after which hydrogen production increases more slowly, but even so the use of an optical concentrator may be beneficial to the economics or performance of the battery. The scope of the present invention therefore includes combining the photoelectrochemical secondary cell and battery claimed herein with an optical concentrator such that sunlight or other light source is collected, concentrated, and used to illuminate the photoanodes in said invention.

The invention claimed is:

1. A method of storing hydrogen by photochemically and/or electrochemically charging a metal hydride, the method comprising:
   a. providing a photoelectrochemical secondary cell comprising a case; a photocatalytic anode or photoanode electrode disposed within the case; an anode electrode disposed within the case; a negative electrode comprising substantially a metal hydride disposed within the case; the photocatalytic anode or photoanode electrode and the anode electrode being disposed on opposed sides of the negative electrode, such that the case and the negative electrode define two separate chambers, a first chamber containing the photocatalytic anode or photoanode electrode and the negative electrode, and a second chamber containing the anode electrode and the negative electrode; a first gas separator disposed in the first chamber; a second gas separator disposed in the second chamber; and an electrolyte disposed in the first and second chambers and capable of being reduced to hydrogen at the negative electrode; at least a portion of the case being transparent to electromagnetic radiation required by the photocatalytic anode or photoanode to charge the photoelectrochemical secondary cell;
   b. exposing the photocatalytic anode or photoanode electrode to radiation while applying zero bias voltage potential, or a bias voltage potential that is lower than the theoretical water splitting voltage of 1.48 VDC, between said photocatalytic anode or photoanode electrode and said negative electrode, and/or applying a voltage potential of at least 1.48 VDC between said anode electrode and said negative electrode, thereby charging said metal hydride with hydrogen.

2. The method of claim 1 wherein the photoelectrochemical secondary cell further comprises a connecting busbar that is placed between an external terminal of the photoanode and an external terminal of the negative electrode.

3. The method of claim 1 wherein the case is provided with removable vents for filling the electrolyte into said case.

4. The method of claim 3 wherein the photoelectrochemical secondary cell further comprises two titanium contacts and one stainless steel contact that protrude through the case and allow the photoanode, anode, and cathode respectively to be accessed electrically through the case in order to apply a bias voltage.

5. The method of claim 3 wherein said transparent portion of said case comprises at least one of ultraviolet-transmitting (UVT) acrylic or borosilicate 3.3 glass.

6. The method of claim 3 wherein said case is constructed of an electrically conductive material such that said anode comprises a portion of said case.

7. The method of claim 1 wherein said negative electrode comprises a conducting substrate and said metal hydride is removable from said conducting substrate and said photoelectrochemical secondary cell.

8. The method of claim 1 wherein said photocatalytic anode or photoanode electrode comprises one or more of the following: titania that is dyed; titania that is doped; strontium titanate; compounds and alloys of titania and titanium with tungsten, tungsten oxide, cadmium sulfide, iron, oxides of iron, or silicon; silicon seeded with nickel surface particles; nanotubes of titanium dioxide; carbon nanotubes further comprising semiconductor materials; graphene; quantum dots; photonic bandgap crystals; strained semiconductor; and strained titania.

9. The method of claim 1 wherein said photocatalytic anode or photoanode electrode and said anode electrode are provided with apertures extending therethrough.

10. The method of claim 1 wherein said anode electrode comprises at least one or more of: nickel hydroxide on nickel; mixed metal oxides of ruthenium, titanium and iridium on titanium; plated nickel or nickel hydroxide film on titanium; and nickel or nickel hydroxide particles on titanium; and wherein said titanium is a rod, plate, sheet, foil, or expanded mesh.

11. The method of claim 1 wherein said anode electrode is formed by at least one or more of: applying a paste; sintering; calcification; thermal oxidation; anodizing; alloying; plating; powder coating; mechanical compression; casting; vacuum deposition; or chemical vapor deposition.

12. The method of claim 1 wherein the first and second gas separators comprise a non-woven felt of at least one or more of: polyolefin; polyethylene; or polypropylene.

13. The method of claim 1 wherein said negative electrode comprises metal hydride in electrical contact with a nickel foam ribbon.

14. The method of claim 1 wherein said metal hydride comprises a metal alloy of one or more of elemental forms: AB; AB2; AB5; or AB5-B.

15. The method of claim 1 wherein said electrolyte comprises at least one of potassium hydroxide or potassium carbonate and may further comprise one or more of the following additives: co-electrolytes, additives for improved high or low temperature performance, or for viscosity or polymerization for leak containment, methanol; thickeners; co-electrolytes; or refractive index matching additives, or for more efficient gas evolution.

16. A method of storing hydrogen by photochemically and/or electrochemically charging a metal hydride, the method comprising:
   a. providing a photoelectrochemical secondary cell comprising a case; a photocatalytic anode or photoanode electrode disposed within the case; an anode electrode disposed within the case; a negative electrode comprising substantially a metal hydride disposed within the case; the photocatalytic anode or photoanode electrode and the anode electrode being disposed on opposed sides of the negative electrode, such that the case and the negative electrode define two separate chambers, a first chamber containing the photocatalytic anode or photoanode electrode and the negative electrode, and a second chamber containing the anode electrode and the negative electrode; a first gas separator disposed in the first chamber; a second gas separator disposed in the second chamber; and an electrolyte disposed in the first and second chambers and capable of being reduced to hydrogen at the negative electrode; at least a portion of the case being transparent to electromagnetic radiation required by the photocatalytic anode or photoanode to charge the photoelectrochemical secondary cell;

b. applying a direct current voltage potential between said anode electrode and said negative electrode, whereupon hydrogen is both produced and absorbed by the metal hydride of said negative electrode, thereby charging said metal hydride with hydrogen.

\* \* \* \* \*